(12) United States Patent
Suttor et al.

(10) Patent No.: US 7,431,545 B2
(45) Date of Patent: Oct. 7, 2008

(54) METHOD FOR PRODUCING DENTURES

(75) Inventors: Daniel Suttor, Seefeld (DE); Thomas Sprengart, Landsberg (DE); Michael Schaaf, Herrsching (DE); Guenter Hertlein, Seefeld (DE)

(73) Assignee: 3M ESPE AG, Seefeld (DE)

( * ) Notice: Subject to any disclaimer, the term of this patent is extended or adjusted under 35 U.S.C. 154(b) by 537 days.

(21) Appl. No.: 10/495,386

(22) PCT Filed: Nov. 14, 2002

(86) PCT No.: PCT/EP02/12738

§ 371 (c)(1),
(2), (4) Date: May 11, 2004

(87) PCT Pub. No.: WO03/041606

PCT Pub. Date: May 22, 2003

(65) Prior Publication Data

US 2005/0019121 A1   Jan. 27, 2005

(30) Foreign Application Priority Data

Nov. 15, 2001   (DE) ................................ 101 56 156

(51) Int. Cl.
*B23C 3/00* (2006.01)
(52) U.S. Cl. .................... 409/132; 409/193; 409/137
(58) Field of Classification Search .................. 409/79, 409/80, 131, 132, 136, 137, 186, 193, 194
See application file for complete search history.

(56) References Cited

U.S. PATENT DOCUMENTS

| | | | | |
|---|---|---|---|---|
| 3,665,493 A | * | 5/1972 | Glowzewski et al. | 318/561 |
| 4,078,195 A | * | 3/1978 | Mathias et al. | 318/561 |
| 4,621,959 A | * | 11/1986 | Kishi et al. | 409/84 |
| 4,707,793 A | | 11/1987 | Anderson | |
| 4,850,761 A | * | 7/1989 | Breuer et al. | 409/132 |
| 4,937,928 A | * | 7/1990 | van der Zel | 29/896.1 |
| 5,011,345 A | * | 4/1991 | Nishigai et al. | 409/132 |
| 5,378,091 A | * | 1/1995 | Nakamura | 409/132 |

(Continued)

FOREIGN PATENT DOCUMENTS

CA   2 380 576 A1   2/2001

(Continued)

OTHER PUBLICATIONS

Ahlmann, "CAD/CAM Systeme, Technik richtig gerechnet," *Zahntechnik Wirtschaft, Labor* pp. 65-66 (Feb. 1999)(English Language Translation, "CAD/CAM Systems, Technology properly calculated," (3pgs.)) (Feb. 1999).

(Continued)

*Primary Examiner*—Daniel W Howell
(74) *Attorney, Agent, or Firm*—Mueting, Raasch & Gebhardt, P.A.

(57) ABSTRACT

The invention relates to a method for producing dentures by milling a workpiece. The inventive method is characterized in that in the event of a change in the load on the workpiece or on the milling tool, or on the workpiece and on the milling tool, determined before the milling begins and occurring during the milling, the relative speed between the milling tool and the workplace is varied without using a regulation technique.

12 Claims, 3 Drawing Sheets

U.S. PATENT DOCUMENTS

| | | | |
|---|---|---|---|
| 6,428,252 B1* | 8/2002 | Oldani | 409/132 |
| 6,438,446 B1* | 8/2002 | Trachier | 700/180 |
| 6,447,223 B1* | 9/2002 | Farah et al. | 409/132 |
| 6,454,568 B1 | 9/2002 | Beuschel et al. | |
| 6,454,629 B1 | 9/2002 | Basler et al. | |
| 6,597,968 B2 | 7/2003 | Matsumoto et al. | |
| 6,604,015 B2 | 8/2003 | Iriguchi et al. | |
| 6,709,694 B1 | 3/2004 | Suttor et al. | |
| 6,942,436 B2* | 9/2005 | Kakino et al. | 409/84 |
| 2002/0182566 A1 | 12/2002 | Beuschel et al. | |
| 2003/0132539 A1 | 7/2003 | Althoff et al. | |

FOREIGN PATENT DOCUMENTS

| | | |
|---|---|---|
| DE | 3 604 531 A1 | 8/1987 |
| DE | 4 204 327 C2 | 8/1993 |
| DE | 298 15 486 U1 | 2/2000 |
| DE | 199 04 522 A1 | 8/2000 |
| DE | 199 04 523 A1 | 8/2000 |
| DE | 100 37 531 C2 | 1/2002 |
| DE | 101 07 451 A1 | 9/2002 |
| EP | 0 982 009 A2 | 3/2000 |
| EP | 0 982 009 A3 | 3/2000 |
| EP | 1 066 801 A1 | 1/2001 |
| EP | 1 153 002 | 11/2001 |
| EP | 1 154 969 | 11/2001 |
| EP | 1 154 969 B1 | 5/2003 |
| EP | 1 359 882 | 11/2003 |
| JP | 2001-216011 A | 8/2001 |
| JP | 2001-255920 A | 9/2001 |
| WO | WO 00/46166 A1 | 8/2000 |
| WO | WO 00/46168 A1 | 8/2000 |
| WO | WO 01/12097 | 2/2001 |
| WO | WO 01/97707 A1 | 12/2001 |
| WO | WO 02/064099 A1 | 8/2002 |
| WO | WO 03/041606 A2 | 5/2003 |

OTHER PUBLICATIONS

Baltzer et al., "CAD/CAM in der Zahntechnik, CEREC inLab," in German, *Sonderdruck aus dental labor*, Heft May 2001, Verlag Neuer Merkur GmbH, 80939 München, Germany, 6 pgs (English Language Translation, "CAD/CAM in dental technology, CEREC inLab," Special Edition from "dental labor," Issue May 2001, Neuer-Merkur GmbH Publishing Co., 80939 MMunich, (7 pgs.)) (May 2001).

"'Erlkönige' in der Zahntechnik Zirkonoxidkronen und-brücken per Knopfdruck," *Zahntechnik Wirtschaft, Labor* p. 31 (May 1999) (English Language Translation, in *Technology, 'Prototypes' in Dental Technology*, "Zirconium oxide crowns and bridges with the push of a button," (2 pgs.)) (May 1999).

Kurbad et al., "CEREC inLab—State of the art," *Quintessence Zahntechnik (Quintessence Dental Technology)*, 27(9): 1056-1074 (2001).

*Product data sheet (i.e. sales or company literature)*: "Der Arbeitsprozess; Das System; and Anwender, Referenzen Links," datasheets [online]. DCS Dentalsysteme, Varel, Germany, [retrieved on Jan. 27, 1999]. Retrieved from the Internet:<URL: http: //www.dcs-dental.com/arbeitsprozess.html>, <URL: http: //www.dcs-dental.com/system.html>, and <URL: http: //www.dcs-dental.com/anwender.html>; 8 pgs (English Language Translation, "The System; The System; and User Reference Links," (6 pgs.)) datasheets [online].

*Product data sheet (i.e sales or company literature)*: "Geschichte, Produktion, Schulung; Argumente, Zeit, Vielfalt; and Vita Zeta DC-Tell" datasheets [online]. DCS Dentalsysteme, Varel, Germany, [retrieved on Jan. 27, 1999]. Retrieved from the Internet:<URL: http: //www.dcs-dental.com/produktion.html>, <URL: http: //www.dcs-dental.com/argumente.html>, and <URL: http: //www.dcs-dental.com/zeta.html>; 6 pgs (English Language Translation, "The Future is Now; Safety First; and Metal-Free Composite Constructions," (6 pgs.)) datasheets [online].

Product Information Brochure, "All-in-One™ Precision Fit," Nobel Biocare, Göteborg, Sweden, 4 pgs. (2001).

Product Information Brochure, "Cercon Balance Unvergleichlich," in German, Ankylos Biofunktional Inplantieron, Degussa Dental GmbH & Co. KG, Hanau, Germany 4 pgs. (English Translation "Cercon Balance No comparison," (2 pgs.)) (Mar. 2001).

Product Information Brochure, "Cerec 3, Operating Instructions for the Milling Unit/Scanning Milling Unit," Sirona The Dental Company, Sirona Dental Systems GmbH, Title page, Customer Letter, List of Contents, pp. 5-36, and Publication page (Feb. 2000).

Product Information Brochure, "DC-Tell. Das faserverstarkte Polyamid. DC-TELL®," in German, DCS Dental AG, Allschwil, Germany (2 pgs) (English Language Translation, "The fiberglass-reinforced polyamide, DC-TELL®," (2 pgs.)) (Published on or before Sep. 17, 2001).

Product Information Brochure, "DC-Titan. Das leichte Metall. DC-TITAN®," in German, DCS Dental AG, Allschwil, Germany (2 pgs) (English Language Translation, "The light metal, DC-TITAN®," (2 pgs.)) (Published on or before Sep. 17, 2001).

Product Information Brochure, Natt et al., "Das Precident DCS-System Metallfreie Frontzahnbrücken aus Hochleistungskeramik," in German, *dental labor*, XLVII, Heft Jun. 1999, pp. 999-1010 (English Language Translation, Natt et al., "The Precedent DCS System, Metal-free Incisor Bridges made of High-Performance Ceramics," in dental labor, XLVII, (12 pgs.)) (Jun. 1999).

Product Information Brochure, "Das Precident System. Praziser. Vielseitiger. Und wirtschaftlicher." in German, DCS Dental AG, Allschwil, Germany, 5 pgs, (Apr. 1999) (English Language Translation, "The Precident System. More Accurate. More versatile. And more cost-effective." (5 pgs)) (Apr. 1999).

Product Information Brochure, "DCS IDS 2001 Preisliste in Euro" in German (2 pgs.) (English Translation of DCS IDS Price List (2 pgs.) (2001).

Product Information Brochure, "DCS Precident System," Austenal ISO 9001 Certified, Chicago, IL (2 pgs.) (Sep. 12, 2000).

Product Information Brochure, "Dental CAD/CAM GN-I," in Japanese, GC Corporation, Tokyo, Japan (5 pgs) (English Language Translation, "Dental CAD/CAM GN-I Now Debuts," (4 pgs)) (Published on or before Jan. 2002).

Product Information Brochure, "Die Procera® Technik, auf einen Blick, Volkeramische Kronen, Kronen und Brücken aus Titan, Individualisierte Distanzhülsen," in German, Nobel Biocare AB, Göteborg, Sweden, 6 pgs (English Language Translation, "The Procera Technique, In one view, All-Ceramic crowns, Crowns and bridges made of titanium, Individualized centric posts," (6 pgs.)) (Published on or before Aug. 2000).

Product Information Brochure, "Die reine Keramik. DC-ZIRKON®," in German, DCS Dental AG, Allschwil, Germany (2 pgs) (English Language Translation, "The pure ceramic, DC-ZIRKON®," (2pgs.)) (Published on or before Sep. 17, 2001).

Product Information Brochure, "Ein innovatives Material erfordert ein smarte Lösung. Cercon smart ceramics das CAM-gestützte Volkeramiksystem. Degussa Dental a healthy world smiles," in German (11 pgs) (English Translation "Cercon smart ceramics. The CAM-supported full-ceramic system, Degussa Dental A healthy world smiles," (6 pgs.)) (2002).

Product Information Brochure, "G Girrbach Dental-Systeme, diGident® CAD/CAM Frei-Form Wahl-Frei, Präzision, Funktion, Ästhetik, Ethik," in German, Girrbach Dental GmbH, Pforzheim, Germany, (12 pgs) (English Language Translation "G Girrbach Dental Systems, diGident® CAD/CAM Freeform-free choice, Precision, Function, Aesthetic, Ethic" (11 pgs.)) (Apr. 1999).

Product Information Brochure, "Input Spezial, Neues von Degussa Dental für das Labor, IDS'2001-13 Degussa Dental auf dem neuesten Stand," in German, Degussa Dental GmbH & Co. KG, Hanau, Germany (10 pgs) (English Language Translation "Input IDS 2001—Degussa Dental is state-of-the-art, Cercon—the CAM supported, all-ceramic system. Crowns and bridges made of zirconium oxide ceramic," (7 pgs)) (2001).

Product Information Brochure, "Its time for digital solutions Cicero® C" in German, Cicero® Dental Systems B. V., Hoorn, Niederlande (12 pgs) (English Translation (10 pgs.)) (Apr. 1999).

Product Information Brochure, "PRECISCAN®," in German, DCS Dental AG, Allschwil, Germany, 2 pgs (English Language Translation, "PRECISCAN®," (2 pgs.)) (Dec. 1998).

Product Information Brochure, "Preisliste DCS® Precident System & Nachrüstpakete," in German, DCS Dental AG, Allschwil, Germany, 5 pgs (English Language Translation, "Price list of DCS Precident System & Retrofit packages," (5 pgs.)) (Jan. 1, 1999).

Product Information Brochure, "Procera® AllCeram—Stark und Schön!" Nobel Biocare AB, Göteborg, Sweden, 1 pg (English Language Translation, "Procera® All Ceram—Strong and beautiful!," (1 pg.)) (Mar. 2001).

Product Information Brochure, "Procera® AllCeram—Stark und Schön! Leichter, Schneller, Besser!" Nobel Biocare AB, Göteborg, Sweden, 8 pgs (English Language Translation, "Procera® All Ceramics—strong and beautiful! Lighter, Faster, Better," (6 pgs.)) (Feb. 2001).

Product Information Brochure, "PROCERA® Klinisches Handbuch," in German, Nobel Biocare AB, Göteborg, Sweden, 16 pgs. (English Language Translation "PROCERA® Clinical Handbook," (12 pgs.))(1996).

"Die Revolution in Der Zahnmedizin und Zahntechnik. Externe CAD/CAM-Fertigung," *Zahntechnik wirtschaft, Labor* p. 71 (May 2000) (English Language Translation, "The revolution in dental medicine and dental technology, External CAD/CAM-production," (2 pgs.)) (May 2000).

Sturzenegger et al., "Klinische Studie von Zirkonoxid-brucken im Seitenzahngebiet hergestellt mit dem DCM-System," in German, Degussa Dental GmbH & Co. KG, Hanau, Germany, *Separatdruck aus Acta Med. Dent. Helv.*, vol. 5: 131-139 and Title page ( English Language Translation, "Clinical Study of Zirconium Oxide Bridges in the Premolar Region produced with the DCM-System," (12 pgs.)) (Dec. 2000).

van der Zel et al., "The CICERO system for CAD/CAM fabrication of full-ceramic crowns," *The Journal of Prosthetic Dentistry*, 85:261-267 (Mar. 2001).

"ASTM Designation: F 67-95, Standard Specification for Unalloyed Titanium for Surgical Implant Applications," *Annual Book of ASTM Standards*, vol. 13.01, pp. 1-3 (1995).

"ISO 5832-2, Implants for Surgery—Metallic Materials—Part 2: Unalloyed Titanium," International Organization for Standardization, Switzerland, Title page, Publication page, Introduction, and pp. 1-4 (1999E).

"DIN EN ISO 6872, Dental Ceramic," International Organization for Standardization, Berlin, Title page, Publication page, and pp. 2-9 (11 pgs total) (1998) (in German).

"ISO 6872, Dental Ceramic," International Organization for Standardization, Switzerland, Title page, Foreword page, Introduction, and pp. 1-9 (17 pgs total, including Amendment 1) (1995).

* cited by examiner

METHOD FOR PRODUCING DENTURES

The present application is a U.S. National Stage Application of PCT/EP02/12738, filed 14 Nov. 2002. The application also claims the benefit under 35 U.S.C. §119 of foreign application No. DE 101 56 156.3, filed 15 Nov. 2001.

The present invention relates to a method of producing dentures by milling a workpiece. In this method, in a method step in which a change in the loading of the workpiece or of the milling tool or of both the workpiece and the milling tool is to be expected on the basis of calculations which have been made before the start of this milling, the relative speed between milling tool and workpiece is changed.

For the machining of blanks, modern dentistry uses computer-controlled imaging and milling devices, what are referred to as CAD/CAM systems. In these systems, first of all either the tooth situation in the mouth of the patient, an impression thereof or a model produced by means of the impression is scanned, so that the three-dimensional shape of the tooth situation is available as a numerical data record. In this case, the scanning is effected mechanically or optically. From the data determined in this way, the shape of the dentures to be produced can be numerically determined. In the event of teeth being missing, for example, in the tooth situation, data for missing teeth, for example, must be added.

On the basis of these data, the shape can be milled out of a workpiece by means of a milling machine. Finally, the completion of the dentures, including any requisite finish machining or facing, is carried out manually. During the milling, the blank is first of all rough-machined in a conventional manner in a first milling step—the "roughing"—and is subsequently machined with greater precision in a second milling step—the "finishing". The milling path and the feed rate are controlled in the methods according to the prior art with the aid of the numerically available data record, as is disclosed, for example, in EP 1 066 801 A1. The feed rate within the scope of the present application refers to the relative speed between workpiece and tool.

The control of the milling path or of the feed rate which is described in the prior art requires considerable outlay in terms of apparatus. In particular, during the entire milling, the instantaneous loading of the milling tool must be continuously determined and the feed rate has to be adapted on the basis of the values determined. The present invention thus makes possible a method which requires a markedly smaller outlay in terms of apparatus and/or electronics compared with the control-based methods.

One object of the present invention was therefore to provide a method which does not require this high outlay in terms of apparatus. It has surprisingly now been found that no control of the feed rate is required even in a complex milling method such as the difficult production of dentures, which, inter alia, require a high accuracy of fit.

Accordingly, the present invention relates to a method of producing dentures by milling a workpiece, which method is characterized in that, during a change in loading of the workpiece or of the milling tool or of both the workpiece and the milling tool, which change in loading is determined before the start of the milling and occurs during the milling, the relative speed between milling tool and workpiece is changed while dispensing with automatic control technology.

In the method according to the invention, these changes in the relative speed may be effected once or several times as a function of the number of changes in loading calculated beforehand.

The milling of the workpiece in the method according to the invention is in principle conceivable by means of all suitable milling strategies. In particular, line-by-line milling, radial milling and circular milling are preferred, it also being possible for two or more of these milling strategies to be combined with one another.

In the method sections in which changes in loading are to be expected, the feed rate can in principle be varied in all conceivable directions. The feed rate can be increased or decreased depending on, for example, the type of change in loading, that is to say depending on whether the loading increases or decreases, on the material of the workpiece, on the geometry of the dentures to be produced and/or on the geometry of the workpiece in the relevant method section. The variation in the feed rate may in this case be varied both continuously and intermittently.

The workpiece and/or the milling tool are/is loaded, inter alia, when the direction of rotation of the milling tool and the direction of movement of the workpiece relative to the milling tool are opposed at the engagement point.

The loading of the workpiece and/or of the milling tool during the milling, and in particular during the line-by-line milling, increases with increasing angle between the surface to be produced and the milling tool axis. This applies in particular when the milling tool plunges perpendicularly into the material of the workpiece. In a preferred embodiment of the method according to the invention, recourse is had to a reduction in the feed rate starting from a certain angle between the feed direction and the horizontal in order to avoid overloading of tool and/or material. This angle is generally in the region of greater than or equal to 1°, preferably greater than or equal to 45°, and in particular preferably greater than or equal to 60° to less than or equal to 90°.

In addition, high loading of the workpiece and/or of the milling tool during the milling occurs when the milling tool is surrounded by workpiece material in a large peripheral region, in particular in a peripheral region of greater than or equal to 90°, in particular at almost 180°, as occurs, for example, when making cuts in the three-dimensional shape to be produced during circular milling. As already described above, the method according to the invention provides for loading peaks of this type to be localized with the aid of the numerically available data record before the start of the milling. In a preferred embodiment, the method according to the invention provides for the feed rate at these locations to be reduced. If this loading consequently changes again to lower values, the feed rate, according to the invention, can be increased again.

In a likewise preferred embodiment of the method according to the invention, further relief of the milling tool during the machining of workpieces is achieved in that the milling tool, during circular milling for example, does not plunge perpendicularly to the depth of cut of the respective plane, but rather plunges along a ramp which encloses an angle with the workpiece surface of generally less than 90° and preferably less than or equal to 89°. In particular during the machining of workpieces which are made, for example, of titanium or other metals, as are cited below, angles of less than or equal to 45°, preferably less than or equal to 10°, more preferably less than or equal to 5° and in particular preferably angles in the region of 1 to 2° are also preferred in this respect. Instead of a single ramp, the milling tool may also describe, for example, a zigzag path, in which it plunges forward and backward via a plurality of small ramps until the desired depth of cut is achieved. As soon as the milling tool has achieved the desired depth of cut, it covers a complete circular path in the case of the circular milling, in the course of which the regions not milled away to begin with by the ramp angle or angles are preferably milled away.

In a likewise preferred embodiment of the method according to the invention, further relief of the milling tool during the machining of workpieces is achieved in that the direction of rotation of the milling tool and the direction of movement of the workpiece relative to the milling tool during the milling are in synchronism at the engagement point. With this preferred embodiment, the relative movement is selected in such a way that it does not take place against the cutting edge of the milling tool.

In the method according to the invention, the movement of the milling tool may take place in one, two or three space axes. The movement in 3 space axes is preferred, these axes preferably being at right angles to one another and constituting linear axes in a further preferred manner. In a likewise preferred embodiment of the method according to the invention, the workpiece is machined by the milling tool on both the underside and the top side. In an especially preferred embodiment, 2 axes are covered by the movement of the milling tool, and the third axis is covered by the movement of the workpiece.

Within the scope of the method according to the invention, it is possible, inter alia, to produce dentures and structures right up to full dental arches. Accordingly, inlays, onlays, implants or blocking can also be produced.

The workpieces which can be used in the method according to the invention are all the workpieces from which dentures can be produced. Suitable materials from which the workpieces are produced are metals and non-metals.

In this case, preferred metals are, inter alia, titanium, such as, for example, titanium grades 1 to 4, preferably grade 2, titanium alloys, such as, for example, Ti-6A1-4V, noble metals or noble-metal alloys. The specifications for the titanium grades relate in this case to ISO 5832-2 or to ASTM F67.

In an especially preferred procedure, the workpieces to be machined from metallic materials have parallelepiped geometries. Also preferred are parallelepiped geometries having a length of up to 100 mm, preferably up to 60 mm, more preferably between 15 mm and 60 mm, having a width of up to 100 mm, preferably up to 50 mm, more preferably up to 25 mm, and having a height of up to 50 mm, preferably up to 25 mm, and more preferably up to 20 mm, heights of 10 or 14 mm, inter alia, being especially preferred.

Fiber-reinforced plastics or ceramics, inter alia, may be cited as nonmetallic materials. With regard to the ceramics, presintered ceramics, what are referred to as green ceramics, are preferably used in the method according to the invention. Preferred in turn in this case are green ceramics of zirconium oxide or aluminum oxide, or ceramics as are described, for example, in DE 199 04 522 A1, DE 199 04 523 A1, WO 00/46166 or WO 00/46168, these publications being fully included in this respect in the context of the present application.

The green-body breaking strength of the ceramic workpieces to be machined preferably lies in the region of less than or equal to 50 MPa, furthermore preferably in the region of 10 to 50 MPa, more preferably in the region of 31 to 50 MPa, and especially preferably in the region of 31 to 40 MPa. Such ceramic workpieces are described in DE 101 07 451.4, which in this respect is fully included in the context of the present application. The green-body breaking strength of the ceramic workpieces to be machined is likewise preferably in the region of less than or equal to 50 MPa, more preferably in the region of 10 to 50 MPa, more preferably in the region of 15 to 30 MPa, and especially preferably in the region of 23 to 28 Mpa. Such ceramic workpieces are described in PCT/EP00/07992, which in this respect is fully included in the context of the present application.

The green-body breaking strength was in this case determined in accordance with EN ISO 6872, Part 8.3.2, a cylindrical specimen having a diameter of 25 mm and a thickness of 2 mm being used. The pitch circle diameter of the specimen support is in this case 14 mm and the diameter of the punch is 3.6 mm.

In an especially preferred procedure, the workpieces to be machined from nonmetallic materials have a parallelepiped geometry or cylindrical geometry. Especially preferred with regard to the abovementioned ceramics is the cylindrical geometry having a length of up to 100 mm, preferably between 15 mm and 60 mm, and a diameter of up to 50 mm and preferably of up to 25 mm. With regard to the parallelepiped geometry, ceramic workpieces are preferred which have a length of up to 150 mm, preferably of up to 100 mm, a width of up to 150 mm, preferably of up to 100 mm, and a height of up to 50 mm and preferably of up to 25 mm.

To manipulate the workpiece before, during and/or after the milling, the workpiece may be fastened in a special device. Such devices are described, for example, in EP 0 982 009 A2 and DE 298 15 486 U1, which in this respect are fully included in the context of the present application. In addition to these devices, devices which have a recess at least partly surrounding the workpiece and can be clamped with their outside in the machine tool are also conceivable, the workpiece being connected only to part of the recess, devices of this type being described in DE 100 37 531.6 or PCT/EP01/07050, which in this respect are fully included in the context of the present application.

A further object of the present invention is to avoid a high lubricant consumption. Such lubricants are generally required for flooding and/or cooling the workpiece and/or the milling tool and/or for reducing friction between workpiece and milling tool during the milling.

Compared with the methods according to the prior art, only the minimum lubricant quantities required in each case are consequently used. In particular, in the present method, the flood lubrication method is not used, which is advantageous for ecological reasons in particular with regard to milling operations in which, for example, substances which are only environmentally compatible to a limited extent have to be used as lubricants. Economical advantages due to the lower lubricant consumption may also be mentioned.

Accordingly, the present invention also relates to a method as described above which is characterized in that it is carried out without flood lubrication.

In the method according to the invention, one or more lubricants may be used. If two or more of said lubricants are used, they may be used at the same time or one after the other. If two or more of said lubricants are used at the same time, ready mixtures of two or more may be used, or the individual lubricants may be used separately from one another.

Preferable lubricants are, inter alia, natural or synthetic oils or oil-based compositions, such as, for example, oil/water emulsions. Synthetic oils are especially preferred.

It has proved to be especially advantageous to use lubricant in a quantity of not more than 50 ml per process hour. The expression "process hour" refers in this case to the time taken to mill a workpiece.

Accordingly, the present invention relates to a method as described above which is characterized in that a lubricant quantity of less than or equal to 50 ml per process hour is used.

The lubricant may be fed from outside, from inside or from both outside and inside. The expression "from inside", within the scope of the present application, refers to procedures in which a lubricant is fed via the milling tool. The expression "from outside", within the scope of the present application, refers to all other procedures. Feeding from outside is especially preferred in this case.

Furthermore, the feeding of lubricant may be effected both continuously or in a pulsed manner. Within the limits of a continuous feed, the quantity of the lubricant can in this case be kept constant or varied over time. If the feeding is effected in a pulsed manner, the pulses may be of varying length and the quantity of the lubricant fed per pulse may change from pulse to pulse or may be kept constant.

Also preferred are procedures in which lubricant quantities are used within the range of 1 to 50 ml per process hour and especially preferably within the range of 1 to 10 ml per process hour.

Also preferred are procedures in which lubricant quantities in the region of less than or equal to 1 ml per process hour, especially preferably less than 1 ml per process hour, are used during the milling of the workpiece. In a further especially preferred embodiment, no lubricant is used. This alternative is designated as "dry machining" within the scope of the present application.

Accordingly, the present invention also relates to a method as described above which is characterized in that the workpiece is milled in a dry manner.

The dry machining may in principle be used in the case of all the workpiece materials described above. This machining is especially preferred in the case of nonmetallic workpieces, such as green ceramics for example.

In a preferred embodiment, the dry machining may be effected with a gas feed, the gases used being, inter alia, nitrogen, one or more rare gases, air, or mixtures of two or more of said gases. Furthermore, these gases may also be used as coolant. The gas feed may in this case be effected continuously and/or intermittently, such as, for example, in regular and/or irregular pulses.

The fed gases may be extracted if this is necessary within the scope of the method according to the invention. This extraction may in principle be effected continuously or intermittently, the continuous extraction being preferred.

Within the scope of the present invention, those method sections in the course of the milling of the workpiece in which changes in loading are to be expected, in an especially preferred embodiment, are not determined by automatic control technology in the course of the method, as is effected in the methods according to the prior art and as disclosed, for example, in EP 1 066 801 A1, and in which those data which are obtained during the milling are used for changing the feed rate.

In an especially preferred manner, therefore, within the scope of the method according to the invention, the feed rate is adapted by controlling the changes in loading. The changes in loading and the milling path are therefore determined before the start of the milling with the aid of the numerically available data record, and the respective feed rate is established on this basis before the start of the milling.

In a preferred embodiment, this data record is determined by a method comprising the following steps:
(a) scanning a three-dimensional model of a tooth situation;
(b) producing a data record from these scanning results;
(c) calculating the milling path on the basis of this data record;
(d) calculating the changes in loading within the limits of the calculation of this milling path, in which case, inter alia, the type of milling tool and/or the geometry and/or the material of the workpiece, in addition to the milling path, are included as parameters to be taken into account.

Accordingly, the present invention also relates to a method as described above which is characterized in that the relative movement between milling tool and workpiece is controlled.

In a further preferred embodiment, the chips produced during the milling are extracted directly or indirectly.

In a further preferred embodiment, the extraction is effected directly. In an especially preferred manner, the direct extraction is effected via a suction gap arranged in a circle around the spindle or the milling tool. The spindle in this case refers to the driving and holding unit of the tool.

Accordingly, the present invention also relates to a method as described above which is characterized in that either material cut by the milling or the lubricant used or both material cut by the milling and the lubricant used are removed from the workpiece by direct extraction.

The expression "direct extraction" refers in the present application to procedures in which the extraction is effected essentially directly at the cutting point. The expression "indirect extraction", within the scope of the present application, refers to all those embodiments which do not comprise the "direct extraction".

Especially preferred is a procedure in which this extraction is assisted by continuous or intermittent injection of at least one gas or a gas mixture, such as air for example. The at least one gas may in this case be injected at one or more locations. In an especially preferred embodiment, this injection is effected in a throttle-controlled manner, where, in cases in which the injection is not effected continuously, pulse frequencies within the range of 1 to 60 per sec are preferred, frequencies within the range of 1 to 10 per sec are especially preferred, and frequencies within the range of 1 to 5 per sec are more especially preferred.

It has surprisingly been found that the efficiency of the extraction can be increased by this pulse-like injection by virtue of the fact that more cut material can be removed per unit of time compared with the continuous injection.

Accordingly, the present invention also relates to a method as described above which is characterized in that the efficiency of the extraction of cut material is increased in at least one method step by pulse-like injection of at least one gas or a gas mixture.

Largely continuous injection is preferably effected when machining, for example, metallic workpieces such as titanium workpieces.

The pressures at which injection is effected are preferably within the range of 0.5 to 5 bar, more preferably within the range of 0.75 to 4 bar and especially preferably within the range of 1 to 3 bar. The pressures may be kept constant in the course of the machining or may be changed continuously or intermittently.

The injection is also preferably carried out in such a way that cut material is kept away from the machine guides.

A further advantage of the injection can be seen in further reduced loading of the milling tool by virtue of the fact that friction loss on account of the interaction between milling tool and cut material is avoided.

As already mentioned above, different milling methods, such as, for example, line-by-line milling, radial milling or circular milling, may be used in the method according to the invention.

During line-by-line milling, in principle every second line is milled by up-cut milling. In this case, the problem may occur that the milling tool, when producing deep structures perpendicularly to the line plane, often plunges virtually perpendicularly into the workpiece material and is thus fully in engagement with the workpiece material at the end face for some time without interruption. During such a "drilling action", the milling tool and workpiece are generally subjected to greater mechanical loading.

This disadvantage is avoided by circular milling. In this milling method, the cutter runs around the three-dimensional shape, to be produced, of the dentures in layers in circular paths, so that, except for a plunge operation at the start of each path, only the lateral surface of the milling tool is always in engagement with the tool material. In a preferred embodiment, the method according to the invention is therefore carried out in such a way that the workpiece is subjected to circular milling in at least one method section.

Accordingly, the present invention also relates to a method as described above which is characterized in that the milling of the workpiece is effected by means of circular milling in at least one method step.

The workpiece can therefore be machined solely by circular milling or else by a combination of circular milling and at least one other milling method, preferably either line-by-line milling or radial milling, or line-by-line milling and radial milling.

Accordingly, procedures in which a workpiece is machined, inter alia, by circular milling are also conceivable, at least one lubricant being fed via flood lubrication.

Inter alia, embodiments in which the workpiece is rough-machined in one step and subjected to fine machining in a second step are therefore preferred within the scope of the method according to the invention, the rough machining being effected in a roughing step and the fine machining being effected in a finishing step.

In this case, the roughing step is advantageously carried out by circular milling. Step structures are generally produced on the workpiece by circular milling, and these step structures can be removed in the following finishing step.

Methods are also preferred in which the roughing and finishing steps are effected in different directions of the relative movements of workpiece and milling tool.

Accordingly, the present invention also relates to a method as described above which is characterized in that the milling comprises a roughing step and a finishing step, the roughing step and the finishing step being effected in different directions of the relative movements of workpiece and tool.

In an especially preferred manner, the directions of the feeds during the finishing step, compared with the roughing step, are essentially different.

In a further especially preferred manner, the finishing step is carried out with a single milling tool or with a plurality of identical milling tools or milling tools which are different from one another.

All the workpieces described above can be machined according to this method. In an especially preferred manner, the method is used during the machining of workpieces made of nonmetallic materials, such as, for example, the above-mentioned ceramics and in particular the green ceramics.

Accordingly, the present invention also relates to a method as described above which is characterized in that a nonmetallic workpiece is milled.

A further object of the present invention, in addition to the varying of the feed rate as a function of changes in loading to be expected, is to avoid a situation in which, after the roughing step described above, more workpiece material remains on the workpiece than is favorable for a following finishing step. In this respect, the method according to the invention therefore provides an intermediate step between roughing step and finishing step.

Accordingly, the present invention also relates to a method as described above which is characterized in that it comprises the following steps:

(i) roughing;
(ii) intermediate step;
(iii) finishing.

A situation in which the loading of the milling tool and/or of the workpiece becomes too great during the finishing step is avoided in particular by the intermediate step which is provided according to the invention and which follows the roughing step, during which the structure of the dentures to be produced is generally roughly approximated.

The present invention thus also comprises, inter alia, the three-step methods described with the flood lubrication already described above.

In a preferred embodiment, the step (i) is effected by circular milling, it being possible for this step (i) to be carried out with one milling tool or with a plurality of identical milling tools or milling tools which are different from one another.

Accordingly, the present invention also relates to a method as described above which is characterized in that step (i) is carried out by means of circular milling.

In this case, the intermediate step (ii) may in principle be carried out by all suitable milling methods, the methods already described being preferred.

Accordingly, the present invention also relates to a method as described above which is characterized in that step (ii) is carried out by circular milling or line-by-line milling or radial milling or by a combination of two or more of these types of milling.

Inter alia, this step (ii) is preferably configured as a line-by-line milling method, and also as a radial milling method during the production of crowns.

All the workpieces described above can be machined according to this 3-step method. In an especially preferred manner, the method is used during the machining of workpieces made of metallic materials, such as titanium for example.

Accordingly, the present invention also relates to a method as described above which is characterized in that a metallic workpiece is milled.

Of course, in addition to the steps (i) to (iii), at least one further roughing step and/or at least one further intermediate step and/or at least one further finishing step may be provided.

A further object of the present invention is to ensure that the dentures to be produced fit into the workpiece to be machined. It is therefore checked at the start of the calculation whether the dimensions of the dentures to be produced fit into the workpiece and whether, if appropriate, if this is necessary, the workpiece, while taking the requisite machining space into account, fits into the device already described above, in which the workpiece is fastened for better manipulation. The dimensions of the workpieces to be machined and, if appropriate, the devices in which these workpieces can be fastened are stored and are used for the checking.

Accordingly, the present invention also relates to a method of producing dentures by milling a workpiece, in particular as described above, which method is characterized in that, before the milling of the workpiece, it is checked whether the dentures to be produced by the milling fit into the outer dimensions of a preselected workpiece.

Within the scope of the method according to the invention, it is also possible, before the milling, to select the workpiece to be machined appropriately on the basis of the available data record from two or more workpieces which differ, for example, in geometry or composition. In this case, it is also possible, in combination with the embodiment described above, to both check the workpiece to be machined and select it from two or more workpieces.

Accordingly, the present invention also relates to a method of producing dentures by milling a workpiece, in particular as described above, which method is characterized in that, before the milling, the optimum workpiece with regard to the dentures to be produced is selected from a pool comprising at least 2 workpieces having different outer dimensions, the selection preferably being made via the parameter "material loss to be expected".

According to the method according to the invention, the data record on which the milling path is based can be rotated in the space in such a way that, if appropriate, a smaller initial workpiece can be selected and thus less material loss occurs. In this case, this rotation is expediently effected only about an axis parallel to the axis of rotation of the milling tool. In principle, however, the rotation about all space axes is possible.

So that damage, for example, to thin marginal regions of the three-dimensional shape to be produced is avoided during the milling, the milling path in the method according to the invention is preferably designed in such a way that, after the milling at the critical regions of the abovementioned workpiece materials, such as the abovementioned ceramics for example, a marginal reinforcement in the region of less than or equal to 1 mm, preferably less than or equal to 500 µm, more preferably less than or equal to 300 µm, more preferably less than or equal to 200 µm, more preferably from 20 to 200 µm and especially preferably in the region of 20 to 50 µm remains. In the case of the abovementioned metals and/or metal alloys, these marginal reinforcements are preferably in the region of less than or equal to 200 µm, more preferably from 20 to 200 µm and especially preferably in the region of 20 to 50 µm.

Within the scope of the present application, the expression "marginal reinforcement" refers to a reinforcement of a preparation edge.

In a likewise preferred embodiment of the method according to the invention, the geometry of the workpiece to be machined is also taken into account when calculating the path of movement of the milling tool. For example, in the event of the workpiece to be machined having a cylindrical geometry, as prefered in the case of green ceramics for example, this avoids idling of the milling tool in the edge regions of an imaginary parallelepiped surrounding the cylinder, by virtue of the fact that the actual cylindrical shape, and not the geometrically simpler shape of the parallelepiped, is taken as a basis when calculating the path of movement.

Within the scope of the present application, all suitable tools may in principle be used as the milling tool. If necessary, two or more milling tools may be used for machining the workpiece, with which tools the workpiece is milled simultaneously or successively. Inter alia, for example, milling tools made of carbide, such as from the ISO range K05 to K50 for example, are preferred. The milling tools may have one or more cutting edges. The diameter of the milling tool is generally within the range of 0.5 to 5.0 mm, preferably within the range of 1.0 to 3.0 mm.

In a further preferred manner, projecting lengths are realized with regard to the milling tools in the method according to the invention, these projecting lengths being at least seven times as large as the diameter of the respective milling tool.

Likewise preferred, in particular for milling out deep pockets, are procedures in which the cylindrical shank of the milling tool is relief-ground in a region above the cutting-edge region of the cutter in such a way that said cylindrical shank is not larger than the diameter in the cutting region of the milling tool. This avoids a situation in which the milling tool collides with the workpiece above its cutting region when producing deep pockets.

Within the scope of the method according to the invention, the speed of the milling tool is preferably in the region of less than or equal to 50,000 rev/min, more preferably in the region of 1,000 to 50,000 rev/min, more preferably in the region of 2,000 to 50,000 rev/min, and especially preferably in the region of 5,000 to 35,000 rev/min.

By means of the method according to the invention, the tool life which can be achieved is preferably in the region of 10 to 500 m and more preferably in the region of 50 to 300 m.

If the achievable tool life is less than necessary for the production of the dentures, a preferred embodiment of the method according to the invention provides for the milling tool to be changed during the machining of the workpiece, which in a further preferred manner is effected automatically. The latter embodiment is preferably achieved in such a way that the machine tool used has a plurality of milling tools of the same kind. The present invention also comprises procedures in which a milling tool is exchanged for a milling tool of a different type.

In a further preferred embodiment, a resetting device, by means of which different ratios of projecting length to diameter can be realized during the method, for example in an automated manner, is provided in the method according to the invention.

It is likewise possible, for example in automated manner, during the method, to exchange a first milling tool for another milling tool, which can be the same as or different from the first tool and which is available in a tool pool comprising at least this tool. Such an exchange may also be effected repeatedly during the milling of a workpiece.

The duration of the method for producing the dentures depends, inter alia, on the type of dentures to be produced and on the type of material to be machined. The machining durations are preferably in the region of 15 min to 8 h, more preferably in the region of 15 min to 4 h, more preferably in the region of 15 min to 2 h and especially preferably in the region of 15 min to 1 h.

Within the scope of the method according to the invention, ratios of weight of the cut material to weight of the machined workpiece which generally lie within the range of 5 to 35, preferably within the range of 6 to 30, especially preferably within the range of 7 to 25, more especially preferably within the range of 8 to 20 and most especially preferably within the range of 9 to 15 are achieved by the advantageous embodiments described above.

Figure 1:
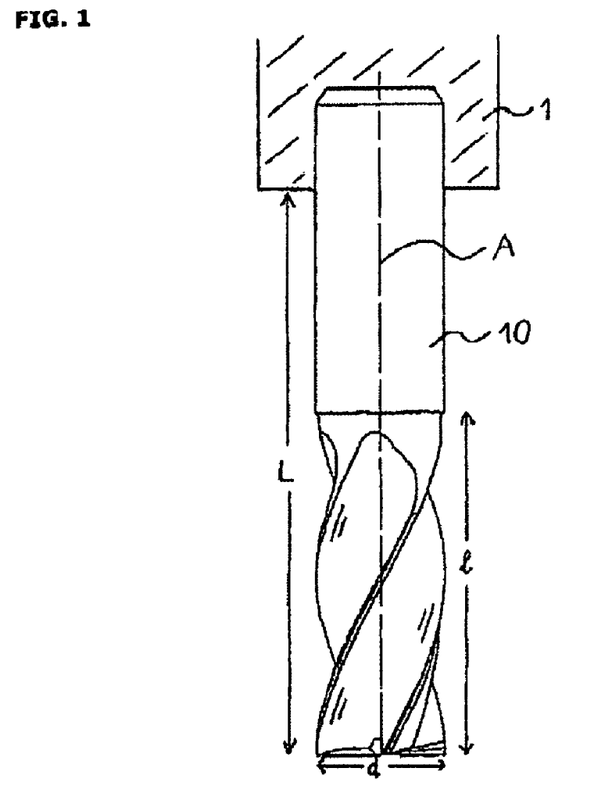
FIG. 1 shows a side view of a milling tool.

The invention is additionally explained with reference to the figures. In the drawing:

FIG. 1 shows a milling tool 10 which is inserted in a tool holder 11 and has a milling tool axis A. The projecting length is indicated by L, the diameter by d and the length of the cutting region by l.

Figure 2:
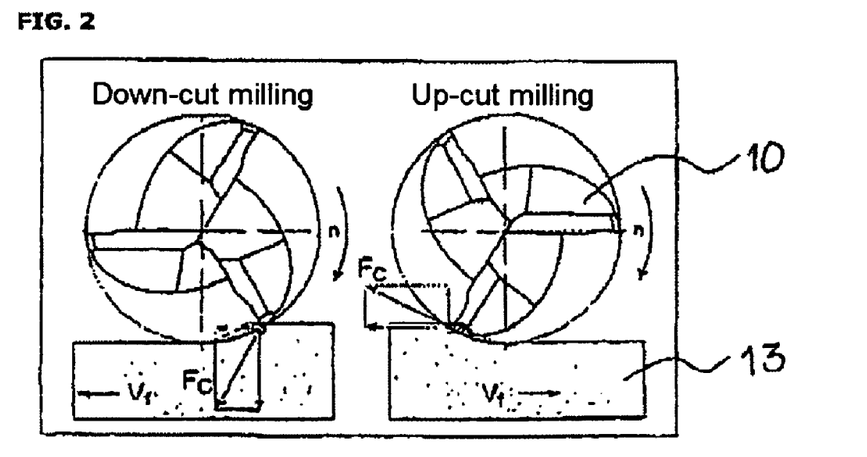
FIG. 2 shows a schematic representations for down-cut and up-cut milling.

FIG. 2 shows two representations of the end face of the milling tool 10 in engagement with a blank 13. The left-hand sketch shows the feeding of the blank at the feed rate $v_f$ in the same direction as the direction of rotation n of the milling tool, whereas the right-hand sketch shows up-cut milling. In addition, the force vector $F_c$ with associated force parallelogram is depicted in both sketches.

Figure 3:
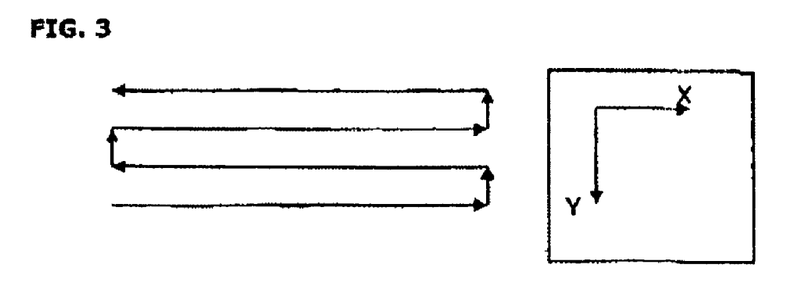
FIG. 3 shows a typical milling path during line-by-line milling.

FIG. 3 schematically shows the xy plane trajectory of the milling path during the line-by-line roughing, which automatically alternates between down-cut and up-cut milling. The distance between two lines is not greater than the milling tool diameter d. The different down feed in the z direction is not shown in the sketch.

Figure 4A:
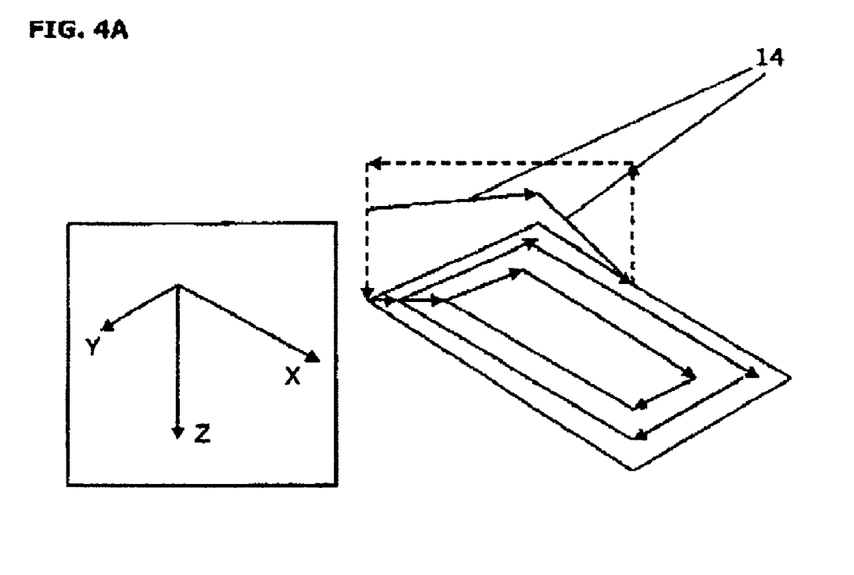
FIG. 4A shows a typical milling path during circular milling.

FIG. 4A shows the path trajectory during the circular milling. First of all the milling tool is fed in along a ramp 14 and then remains over a circular revolution, in addition of the section of the ramp part remaining, at the layer plane depth achieved. The milling tool then approaches the next path and runs around the three-dimensional shape to be produced on a second circular path lying further inward by at most one cutting tool diameter d.

Figure 4B:
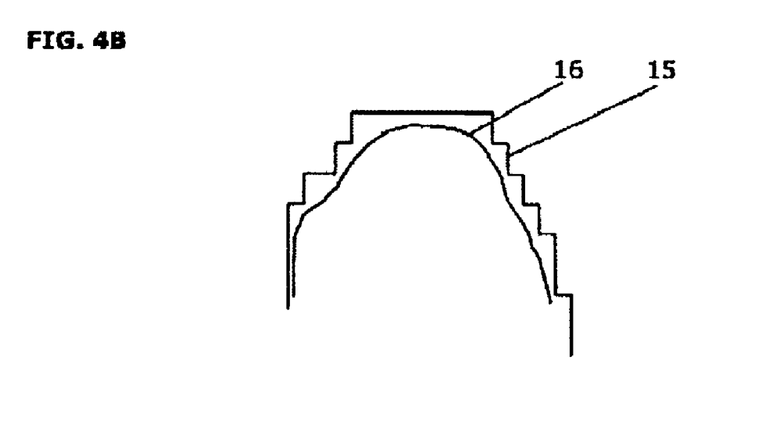
FIG. 4B shows a sectional view of the workpiece after the circular milling.
Figure 5:
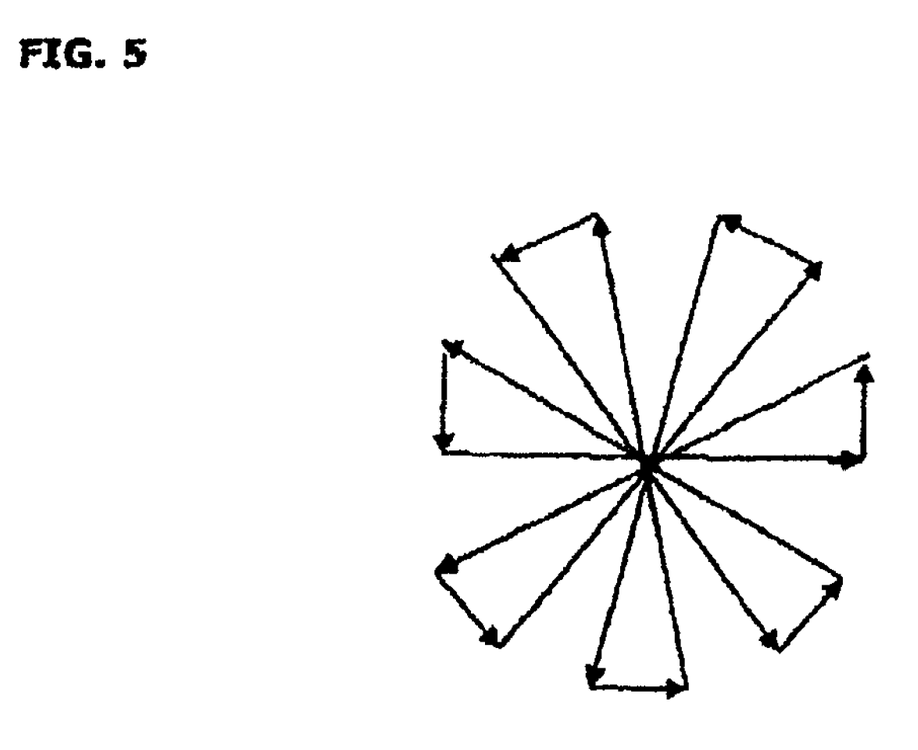
FIG. 5 shows a typical milling path during radial milling.

FIG. 4B shows a sectional view of a stepped shape 15 which has been produced by circular milling and which approximates to the three-dimensional shape 16 to be produced. It becomes clear that the three-dimensional shape cannot be approximated as accurately as during line-by-line milling.

The invention claimed is:

1. A method of producing dentures comprising:
   calculating the expected change in loading of a workpiece, a milling tool, or both the workpiece and the milling tool before the start of milling; and
   changing the relative speed between the milling tool and the workpiece during milling based on the calculated expected change in loading, while dispensing with automatic control technology using instantaneous loading determined during milling, wherein a lubricant quantity of less than or equal to 50 ml per process hour is used, wherein either material cut by the milling or the lubricant used or both material cut by the milling and the lubricant used are removed from the workpiece by direct extraction, and wherein the efficiency of the extraction of cut material is increased in at least one method step by pulse-like injection of at least one gas or a gas mixture.

2. The method as claimed in claim 1, wherein the method is carried out without flood lubrication.

3. The method as claimed in claim 1, wherein the workpiece is milled in a dry manner.

4. The method as claimed in claim 1, wherein the milling of the workpiece is effected by means of circular milling in at least one method step.

5. The method as claimed in claim 1, wherein the milling comprises a roughing step and a finishing step, the roughing step and the finishing step being effected in different directions of the relative movements of workpiece and tool.

6. The method as claimed in claim 5, wherein a nonmetallic workpiece is milled.

7. The method as claimed in claim 6, comprising:
   (i) roughing;
   (ii) intermediate step to roughly approximate the structure of the dentures to be produced;
   (iii) finishing.

8. The method as claimed in claim 7, wherein step (i) is carried out by means of circular milling.

9. The method as claimed in claim 7, wherein step (ii) is carried out by one or more of circular milling, line-by-line milling, and radial milling.

10. A method of producing dentures comprising:
    calculating the expected change in loading of a workpiece, a milling tool, or both the workpiece and the milling tool before the start of milling; and
    changing the relative speed between the milling tool and the workpiece during milling based on the calculated expected change in loading, while dispensing with automatic control technology using instantaneous loading determined during milling; wherein a lubricant quantity of less than or equal to 50 ml per process hour is used, wherein either material cut by the milling or the lubricant used or both material cut by the milling and the lubricant used are removed from the workpiece by direct extraction, and wherein the efficiency of the extraction of cut material is increased in at least one method step by pulse-like injection of at least one gas or a gas mixture; wherein the milling comprises a roughing step and a finishing step, the roughing step and the finishing step being effected in different directions of the relative movements of workpiece and tool; and further wherein a metallic workpiece is milled.

11. The method as claimed in claim 1 wherein before the milling of the workpiece, it is checked whether the dentures to be produced by the milling fit into the outer dimensions of a preselected blank.

12. The method as claimed in claim 1, wherein before the milling, the optimum blank with regard to the dentures to be produced is selected from a pool comprising at least 2 blanks having different outer dimensions.

* * * * *